(12) United States Patent
Tsiaflakis et al.

(10) Patent No.: US 10,171,652 B2
(45) Date of Patent: Jan. 1, 2019

(54) METHOD AND DEVICE FOR CONTROLLING A VECTOR PROCESSOR

(71) Applicant: Alcatel Lucent, Boulogne-Billancourt (FR)

(72) Inventors: Paschalis Tsiaflakis, Schriek (BE); Jochen Maes, Antwerp (BE); Dirk Vanderhaegen, Wemmel (BE); Geert Ysebaert, Antwerp (BE); Wim Van Damme, Schriek (BE)

(73) Assignee: ALCATEL LUCENT, Boulogne Billancourt (FR)

( * ) Notice: Subject to any disclaimer, the term of this patent is extended or adjusted under 35 U.S.C. 154(b) by 70 days.

(21) Appl. No.: 15/520,498

(22) PCT Filed: Nov. 12, 2015

(86) PCT No.: PCT/EP2015/076409
§ 371 (c)(1),
(2) Date: Apr. 20, 2017

(87) PCT Pub. No.: WO2016/078999
PCT Pub. Date: May 26, 2016

(65) Prior Publication Data
US 2017/0318150 A1    Nov. 2, 2017

(30) Foreign Application Priority Data

Nov. 17, 2014    (EP) .................................... 14306820
Jul. 2, 2015    (EP) .................................... 15306080

(51) Int. Cl.
*H04M 3/18*    (2006.01)
*H04L 1/00*    (2006.01)
(Continued)

(52) U.S. Cl.
CPC ................ *H04M 3/18* (2013.01); *H04B 3/32* (2013.01); *H04B 3/487* (2015.01); *H04L 1/0009* (2013.01);
(Continued)

(58) Field of Classification Search
CPC ........................................................ H04M 3/18
(Continued)

(56) References Cited

U.S. PATENT DOCUMENTS 5,563,817 A * 10/1996 Ziegler, Jr. .............. G06F 17/10
708/322
2013/0136254 A1    5/2013 Lu et al.
(Continued)

FOREIGN PATENT DOCUMENTS

EP        2466757 A1    6/2012
JP    2004-015391 A    1/2004
(Continued)

OTHER PUBLICATIONS

International Search Report PCT/ISA/210 for International Application No. PCT/EP2015/076409 dated Feb. 3, 2016.
(Continued)

*Primary Examiner* — Md S Elahee
(74) *Attorney, Agent, or Firm* — Harness, Dickey & Pierce, P.L.C.

(57) ABSTRACT

In accordance with an embodiment the method includes temporarily configuring the vector processor with a new set of vectoring coefficients during one or more selected symbol positions; restoring the current set of vectoring coefficients outside the one or more selected symbol positions; obtaining at least one error measure over respectively at least one line of the group of vectored lines during the one or more selected symbol positions; and determining a suitability
(Continued)

indication for the new set of vectoring coefficients based on the obtained at least one error measure.

15 Claims, 3 Drawing Sheets

(51) Int. Cl.
| | | |
|---|---|---|
| | *H04L 1/20* | (2006.01) |
| | *H04L 1/24* | (2006.01) |
| | *H04L 25/03* | (2006.01) |
| | *H04B 3/487* | (2015.01) |
| | *H04B 3/32* | (2006.01) |
| | *H04L 12/28* | (2006.01) |
| | *H04M 3/22* | (2006.01) |
| | *H04M 11/06* | (2006.01) |

(52) U.S. Cl.
CPC ............... *H04L 1/201* (2013.01); *H04L 1/24* (2013.01); *H04L 12/2878* (2013.01); *H04L 25/03885* (2013.01); *H04M 3/2209* (2013.01); *H04L 2025/03566* (2013.01); *H04M 11/062* (2013.01)

(58) Field of Classification Search
USPC .......................... 379/406.01–406.16; 708/322
See application file for complete search history.

(56) References Cited

U.S. PATENT DOCUMENTS

2013/0301824 A1   11/2013   Defoort et al.
2014/0328442 A1   11/2014   Liu et al.

FOREIGN PATENT DOCUMENTS

| JP | 2005-236382 A | 9/2005 |
| JP | 2013-540397 A | 10/2013 |
| JP | 2014-502114 A | 1/2014 |
| WO | WO-2012/018289 A2 | 2/2012 |
| WO | WO-2014/180794 A1 | 11/2014 |
| WO | WO-2014/185895 A1 | 11/2014 |

OTHER PUBLICATIONS

Written Opinion of the International Searching Authority PCT/ISA/237 for International Application No. PCT/EP2015/076409 dated Feb. 3, 2016.

* cited by examiner

METHOD AND DEVICE FOR CONTROLLING A VECTOR PROCESSOR

CROSS-REFERENCE TO RELATED APPLICATIONS

This application is a national phase under 35 U.S.C. § 371 of PCT International Application No. PCT/EP2015/076409 which has an International filing date of Nov. 12, 2015, which claims priority to European Application No. 14306820.3, filed Nov. 17, 2014, and European Application No. 15306080.1, filed Jul. 2, 2015 the entire contents of each of which are hereby incorporated by reference.

TECHNICAL FIELD OF THE INVENTION

The field of the invention relates to controlling of vector processors. Embodiments of the invention relate to a method for controlling a vector processor for jointly processing signals to be transmitted over, or received from, a group of vectored lines; to a controller for controlling a vector processor for jointly processing signals to be transmitted over, or received from, a group of vectored lines; and to an access node comprising such a controller.

TECHNICAL BACKGROUND OF THE INVENTION vectored DSL techniques have gained interests in recent years as the vectoring technology can cancel out Far-End CrossTalk (FEXT) basically by using a precoder in downstream and/or a postcoder in upstream. The precoder and/or postcoder will compensate for the effects of crosstalk on a communication channel formed by a group of Digital Subscriber Lines (DSL). When a new line is introduced which needs to join an operative vectoring group (a joining line hereinafter), the precoder and/or postcoder coefficients (or vectoring coefficients hereinafter) have to be updated.

With vectoring, the initialization time of a DSL line has increased from ~30 seconds to ~2 minutes. This is often considered unacceptable by operators, since the DSL service will be interrupted by that time when a line retrains. A technique to reduce initialization times is to use historical vectoring coefficients. However, there is a risk that the historic vectoring coefficients are corrupted or not applicable anymore in the next initialization phase. In that case, the line will not come into show-time, and other lines could retrain such that the amount of time spent for the initialization is a multiple of 2 minutes.

Secondly, during tracking, new vectoring coefficients are being computed. However, when applying an updated and not optimal set of vectoring coefficients, vectored lines sharing the same binder may see errors until seamless Rate Adaption (SRA), emergency rate adjustment (SOS) or bit swap kicks in. This may lead to instabilities in a vectored system.

SUMMARY OF THE INVENTION

It is an object of the present invention to reduce the time needed to update vectoring coefficients of a vector processor associated with a group of vectored lines, whilst at the same time keeping an acceptable vectoring accuracy.

In accordance with a first aspect of the invention, a method for controlling a vector processor for jointly processing signals to be transmitted over, or received from, a group of vectored lines, and configured with a current set of vectoring coefficients, comprises temporarily configuring the vector processor with a new set of vectoring coefficients during one or more selected symbol positions; restoring the current set of vectoring coefficients outside the one or more selected symbol positions; obtaining at least one error measure over respectively at least one line of the group of vectored lines during the one or more selected symbol positions; and determining a suitability indication for the new set of vectoring coefficients based on the obtained at least one error measure.

In accordance with another aspect of the invention, a controller for controlling a vector processor for jointly processing signals to be transmitted over, or received from, a group of vectored lines, and configured with a current set of vectoring coefficients, comprises a configuring module configured to temporarily configure the vector processor with a new set of vectoring coefficients during one or more selected symbol positions, and for restoring the current set of vectoring coefficients outside the one or more selected symbol positions; an obtaining module configured to obtain at least one error measure over respectively at least one line of the group during the one or more selected symbol positions; and a determining module configured to determine a suitability indication for the new set of vectoring coefficients based on the obtained at least one error measure.

Such a controller typically forms part of an access node, such as a Distribution Point Unit (DPU), or a Digital subscriber Line Access Multiplexer (DSLAM) deployed from a Central office (CO) and within a remote cabinet closer to subscriber premises.

In one embodiment of the invention, the one or more selected symbol positions are SYNC symbol positions that are used to convey pilot signals for crosstalk estimation within the group of vectored lines.

In a further embodiment of the invention, the at least one error measure is representative of at least one residual error over respectively the at least one line during the one or more selected SYNC symbol positions.

In still a further embodiment of the invention, the method further comprises, if the determined suitability indication indicates that part or whole of the new set of vectoring coefficients is suitable, enforcing part or whole of the new set of vectoring coefficients during all symbol positions.

In a further embodiment of the invention, the method further comprises, if the determined suitability indication indicates that part or whole of the new set of vectoring coefficients is not suitable, selecting a new algorithm for updating the vector processor based on the at least one error measure, or adjusting one or more parameters of an algorithm currently used for updating the vector processor based on the at least one error measure; and determining a further new set of vectoring coefficients by means of the selected new algorithm or adjusted current algorithm.

One can re-iterate through the steps of the method with the further new set of vectoring coefficients in order to determine a further suitability indication for the further new set of vectoring coefficients; or alternatively, the further new set of vectoring coefficients can be directly applied to the vector processor during all symbol positions without determining a suitability indication for these new vectoring coefficients (e.g., if the new selected algorithm is a safe algorithm that always converges).

In an alternative embodiment of the invention, the one or more selected symbol positions are DATA symbol positions that are used to convey user payload traffic.

In a further embodiment of the invention, the at least one error measure is representative of any transmission error respectively occurring over the at least one line during the one or more selected DATA symbol positions, and comprises at least one of a Forward Error Correction (FEC) counter; a retransmission counter value related to retransmission events of data units transmitted during the one or more selected DATA symbol positions; and a noise level, in particular an impulse noise level.

The obtaining of the at least one error measure may comprise obtaining an error measure for each active line of the group of vectored lines.

In still a further embodiment of the invention, a number of selected DATA symbol positions is determined so as not to significantly degrade user experience over the at least one line, and temporarily configuring is performed with the determined number of selected DATA symbol positions.

Based on the configured or actual protection of the lines, one determines the number of DATA symbol positions that can use the new vectoring coefficients with reasonable risk, e.g. the chance for residual error is smaller than $10^{-3}$.

In still a further embodiment of the invention, the steps of the method are repeated with an increasing number of selected DATA symbol positions if the determined suitability indication indicates that the new set of vectoring coefficients is suitable.

In still a further embodiment of the invention, the group of vectored lines comprises at least one joining line, and a ZERO DATA symbol having zero power (a ZERO DATA symbol comprises all zero vectors) is substituted by a DUMMY DATA symbol having non-zero power (a DUMMY DATA symbol comprises vectors having a specific amplitude) over the at least one joining line during the one or more selected DATA symbol positions.

Herein, the new set of vectoring coefficients is typically for canceling the crosstalk from the at least one joining line into active lines of the group, as well as the crosstalk between the active lines.

In still a further embodiment of the invention, determining the suitability indication based on the obtained at least one error measure comprises at least one of determining whether a number of DATA symbols that may be sent with the new set of vectoring coefficients can be increased without user experience degradation; determining whether line parameters of one or more lines of the group of vectored lines need to be modified such that the group of vectored lines becomes more tolerant to the new set of vectoring coefficients; determining whether the new set of vectoring coefficients need further improvement; and determining whether a power of a DUMMY DATA symbol transmitted over at least one joining line can be increased.

In still a further embodiment of the invention, the vector processor is located in a transmitter section or in a receiver section. The method further comprises communicating, from the transmitter section to the receiver section, the positions of the one or more selected DATA symbol positions; or communicating, from the receiver section to the transmitter section, a request for substituting ZERO DATA symbols with DUMMY DATA symbols in predetermined symbol positions.

In another embodiment of the invention, the new set of vectoring coefficients are derived from previously-determined crosstalk or vectoring coefficients.

Also, the new set of vectoring coefficients may be associated with a new set of gains. The suitability indication may then also be an indication for the suitability of the new set of gains. The temporarily configuring may use a new set of gains associated with the new set of vectoring coefficients. The method may then further comprise communicating the new set of gains from the transmitter section to the receiver section, such that the receiver section is aware of the new set of gains and can perform gain scaling accordingly (e.g., TIGA in G.fast). In an alternative embodiment, the new set of gains is obtained by the receiver section and communicated from the receiver section to the transmitter section (e.g., fine-gain scaling coefficients gi in VDSL2 and G.fast).

Embodiments of a controller according to the invention correspond with the embodiments of a method according to the invention.

Embodiments are based inter alia on the inventive insight that a new set of vector processor can be controlled, and in particular that a new set of vectoring coefficients can be verified by activating the new set of vectoring coefficients only during dedicated symbol positions, and by checking the error measures for the corresponding symbol positions.

The dedicated symbol positions can be one or more SYNC symbol positions, which typically occurs once in a superframe and which are used for pilot transmission and crosstalk estimation within the group of vectored lines, or one or more DATA symbol positions, which are use to convey user payload traffic.

In the first case, the error measure typically refers to the slicer error (i.e., the vector difference between the equalized received frequency sample and the constellation point onto which this sample is demapped), or to the received noisy sample before equalization. The error measure can further undergo some extra processing for the determination of the suitability indication, such as the correlation of the successive slicer errors gathered during at least one full pilot cycle with the respective pilot sequences transmitted over the respective subscriber lines.

In the second case, the error measure typically refers to error statistics related to data unit that have been transmitted during the dedicated DATA symbol positions, such as FEC counters, retransmission events, and so forth. The dedicated DATA symbol positions typically represents less than 20 percent of the available DATA symbol positions, and preferably less than 10 percent of the available DATA symbol positions. In this way the impact on the active users is limited or negligible, because this ratio is less than the typical error protection against impulse noise.

Preferably the controlling takes place in a transmitter section and/or in a receiver section. Preferably the vectored lines are a number of DSL lines extending between the transmitter section and the receiver section. The processing can be done before the sending, at the transmitter side, and/or after the sending, at the receiver side. When the processing is done before the sending, the configuring may imply the applying of a new set of precoder coefficients in the precoder, and when the processing is done after the sending, the configuring may imply the applying of a new set of postcoder coefficients in the postcoder. Further it is noted that the applying of the new set of vectoring coefficients may comprise the applying of a full or a partial set of vectoring coefficients, wherein the partial set is e.g. a subset for a particular tone and/or for a particular direction of communication, or a subset of the disturber/victim combinations.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DETAILED DESCRIPTION OF THE INVENTION

Figure 1:
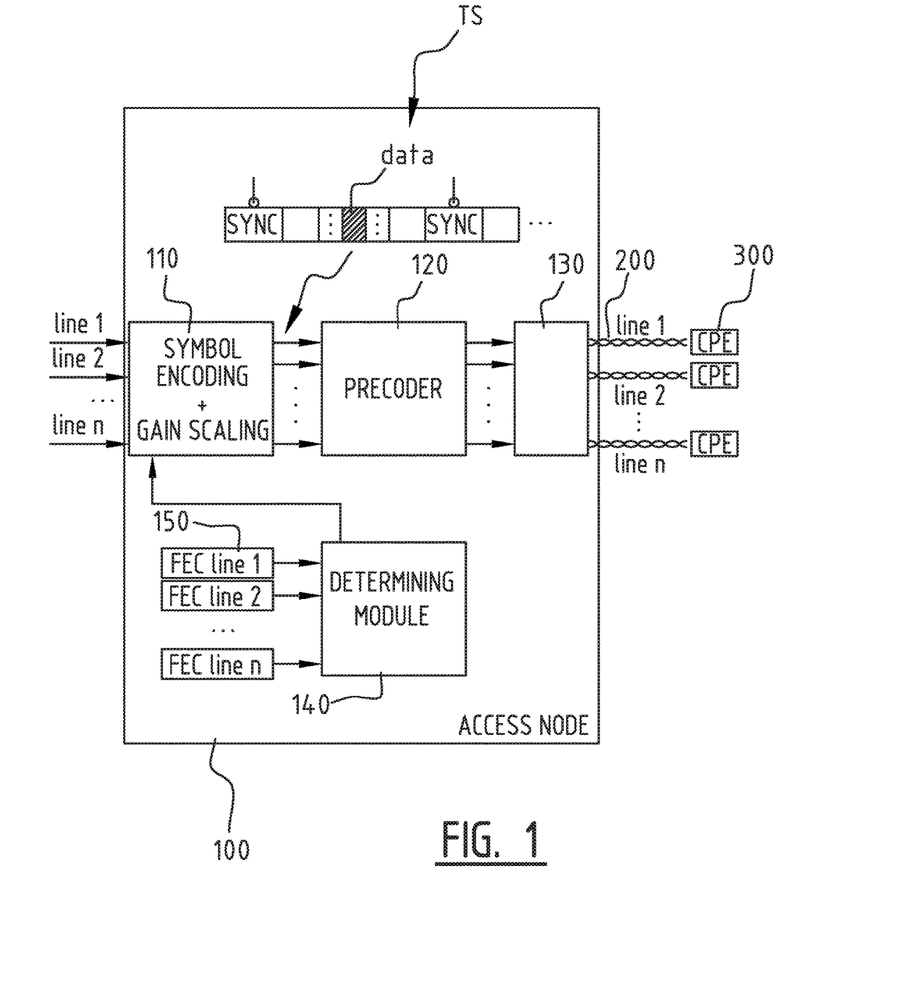
FIG. 1 illustrates schematically an exemplary embodiment of an access point during initialization.

FIG. 1 illustrates an embodiment of an access node including a device 100, here a transmitter section, configured for sending data signals over a number of vectored lines, here digital subscriber lines 200 to a number of CPE's 300 with respective receiver sections. The device 100 comprises a configuring module in the form of a symbol encoding and gain scaling module 110, and a vector processor 120. In the illustrated example the vector processor is a precoder 120 associated with a set of vectoring (precoder) coefficients and being configured for precoding a set of signals for the lines 1 to n, using said set of precoder coefficients; a sending module 130 configured for sending the precoded signals to the CPE's 300 over the digital subscriber lines 200; and a determining module 140.

When a DSL termination unit or modem of a CPE 300, is first connected to a DSL network, it goes through a fairly extensive initialization process. The first step is a handshake. Typically the handshake is used to determine the capabilities of the CPE's (e.g., a modem), such as the frequency range and number of DMT subcarriers supported, and to indicate which protocol will be used for the remainder of the initialization. Typically the remaining steps are transceiver training, channel analysis, and exchange. The transceiver training includes channel estimation and precoder updating.

During initialization (phase 1), when initializing one or more lines of the plurality of DSL lines 1-n, according to prior art solutions a test signal comprising a plurality of SYNC symbols on which a pilot sequence is modulated, is sent over the initializing lines in order to obtain error feedback which can be used for setting the precoder. A pilot sequence in DSL technology is a series of pilot signals which can be described as a sequence of 4-QAM constellation points for a certain tone. The sequence of constellation points is transmitted during successive SYNC symbols. Such a SYNC symbol is periodically transmitted, e.g. for VDSL every 257 DMT symbols.

According to an embodiment of the invention the configuring module 110, also called symbol encoding and gain scaling module, is configured for temporarily configuring the vector processor 120 with a new set of vectoring coefficients during one or more selected or targeted DATA symbol positions, and for restoring the current set of vectoring coefficients outside the selected or targeted DATA symbol positions. More in particular the configuring module 110 may be configured to generate a signal TS including a known sequence, e.g. a plurality of SYNC symbols, as well as at least one DATA symbol. To that end the symbol encoding and gain scaling module 110 comprises a signal generator configured for generating a signal for a line including the known sequence as well as at least one DATA symbol.

The generated signal is temporarily precoded with the precoder coefficients in precoder 120. The precoder coefficients may be any precoder coefficients that need to be verified and in particular historic precoder coefficients or new precoder coefficients. Next the precoded signal is sent to a CPE 300 over a line 200. If different lines are being initialized at the same time, multiple signals each including a known sequence and one or more DATA symbols may be sent over the different lines simultaneously. In a possible embodiment, the DATA symbols of signals for different lines are added in different positions in the respective signals, so that it can be derived which line is causing which error. For completeness, it is noted that the precoder coefficients to be verified may also be applied for the active lines.

In a next step at least one error measure which is representative for an error related to the sending of the at least one DATA symbol, is obtained for all active lines. This may consist e.g. in measuring FEC counters 150 of the active lines and/or monitoring retransmission events of all active lines (not shown).

In a following step a suitability indication indicating the suitability of the new set of vectoring coefficients, is determined based on the obtained at least one error measure, and a next step is determined based on the obtained suitability indication. The determining of a next step based on the suitability indication may comprise determining whether the amount of DATA symbols that may be sent over a line with the new set of vectoring (precoder) coefficients can be extended without user experience degradation; and/or determining whether line parameters of one or more lines of said number of digital subscriber lines need to be modified such that the lines become more tolerant to the new set of vectoring (precoder) coefficients; and/or determining whether the new set of vectoring (precoder) coefficients needs further improvement. More in particular the method may comprise determining, based on line settings of at least one line that is affected by the new set of vectoring (precoder) coefficients, a value for an amount of DATA symbols that can be included without user experience degradation on said at least one affected line; and determining a number of DATA symbols to be included in the signal that is being sent and processed, based on the determined value. The determining may further comprise determining that a test signal needs to be generated for those lines for which the obtained at least one error measure indicates that an error has occurred for that line. To that end the determining module 140 receives inputs from the FEC counters 150, and is further configured for performing the determining according to any of the above possibilities. The determining module 140 sends a suitable output signal to the symbol encoding and gain scaling module 110 whereupon the signal generator can generate further signals as determined.

In other words, in phase 1, when the first precoder is set, instead of keeping only SYNC symbols active like in O-P-VECTOR1, also once in a while one DATA symbol is activated (as opposed to phase 2, see further, where DATA symbols are sent continuously). The retransmission events and/or the FEC counters 150 on the active lines for those symbols are checked by determining module 140. The retransmission events are typically available after a round-trip time and the counters are updated roughly every second, so this allows for quick feedback. It can then be decided by the determining module 140 to continue with another phase 1 pilot sequence or to simply skip the sending of further pilot sequences. When there is still a need to execute a phase 1 estimation one might opt to do this with a reduced pilot length and/or to play the pilots on selected lines only, depending on which line(s) had errors. As with typical deployment configurations, one or more Discrete Multi-Tones (DMT) are within the correction capability of any line, the other lines do not see errors due to the probe DATA symbols. Using embodiments of the invention, a historical precoder can be verified quickly, whereupon it can be decided to keep it or to improve it with some further vectoring phases.

Figure 2:
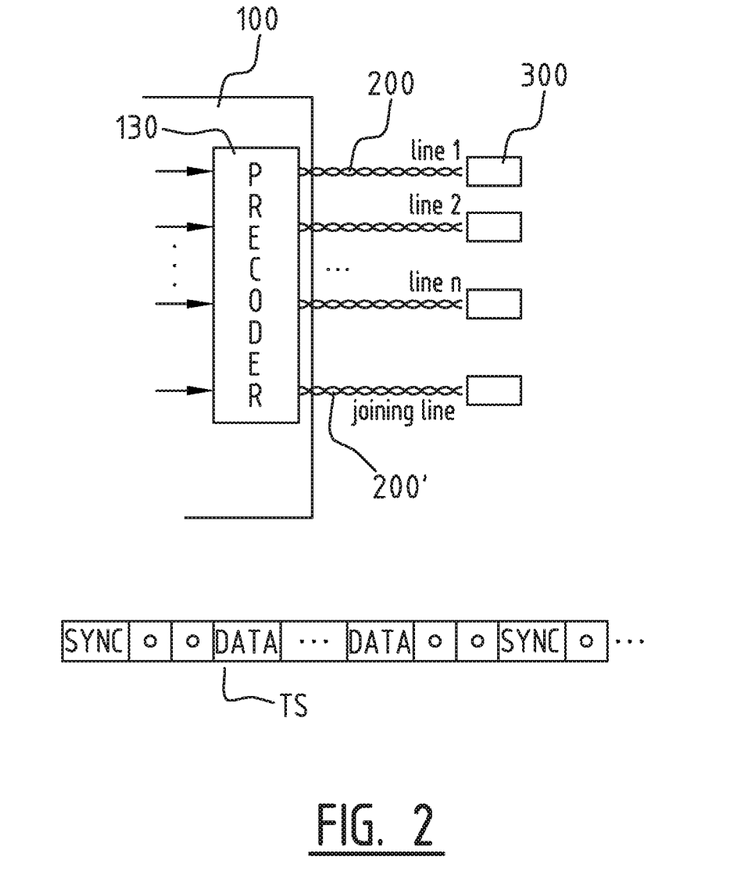
FIG. 2 illustrates schematically an exemplary embodiment of an access point during tracking.

According to another embodiment, a similar method may be performed during phase 2, when there is a joining line 200' which was not precoded in phase 1, or during tracking. This is illustrated in FIG. 2. A signal TS may be generated using e.g. less than 10 percent of the available DATA symbol space. The signal TS is precoded with the precoder coefficients which are to be verified, whereupon the signal is sent on the joining line 200' and the active lines 200. At least one error measure which is representative for an error related to the sending of the signal TS, is obtained for all active lines 200. The error measure may be obtained e.g. by measuring a FEC counter, by monitoring a number of retransmission events, or by monitoring a noise level, in particular an impulse noise level. Next it is determined, based on the obtained at least one error measure, whether the new precoder coefficients are suitable, i.e. whether or not the precoder coefficients should be further improved, and/or whether the line parameters should be modified. Also it can be determined whether further signals with more DATA symbols may be sent, based on the obtained at least one error measure. In other words, the amount of DATA symbols may be gradually increased, and the effect thereof on the other active lines can then be checked using e.g. the retransmission events or the error counters. Finally, depending on the error measures it can be decided to activate the full or partial new precoder for all symbols.

These embodiments have the further advantage that the precoder can be verified in a very short time, allowing shorter initialization times, or allowing an adaptive method to add cycles. The other users do not see errors, even if the new precoder is not right, and a new line can initialize faster.

In still an alternative embodiment of the invention (not shown), the configuring module 110 is configured for temporarily configuring the vector processor 120 with a new set of vectoring coefficients during one or more selected SYNC symbol positions, and for restoring the current set of vectoring coefficients outside the selected SYNC symbol positions, that is to say during the DATA symbol positions and during the remaining non-selected SYNC symbol positions if any.

This embodiment is particularly advantageous as it relies on existing error measures that are readily available. Indeed, error samples performed during the SYNC symbol periods are already reported by the respective receivers for estimation of the various inter-channel/crosstalk couplings, and further for initialization and update of the vector processor.

At the transmitter side, the successive SYNC symbols transmitted over a given line are modulated with a given pilot sequence. More specifically, a subset of the carriers of a SYNC symbol (the so-called pilot tones) are all 4-QAM modulated by the same pilot digit from the given pilot sequence, and transmit one of two complex constellation points, either '1+j' corresponding to '+1' or '−1−j' corresponding to '−1' (VDSL2); or transmit one of three complex constellation points, either '1+j' corresponding to '+1' or '−1−j' corresponding to '−1' or '0+0j' corresponding to '0' (G.fast). The pilot signals may undergo some further data scrambling to improve their randomness.

At the receiver side, two error measurement points are defined. The first measurement point measures the signal as received from a given line on a per carrier basis without any equalization being performed (G.fast). This first measurement point is typically used to estimate the channel matrix or the residual channel matrix. The second measurement point measures the slicer error on a per carrier basis (VDSL2 and G.fast), that is to say the vector difference between the equalized frequency sample and the transmit sample (if the transmit sample is preliminary known to the receiver) or the detected transmit sample (if the transmit sample is unknown to the receiver). The second measurement point is typically used to estimate the normalized channel matrix or the normalized residual channel matrix. Both error samples comprise a real part (the in-phase or I component) and an imaginary part (the quadrature or Q component).

The SYNC symbols transmitted over the respective lines of the vectoring group are time-aligned (super-frame alignment) such that pilot insertion over any line is synchronized with error measurements over any other line.

The successive error samples gathered over a given victim line are next correlated with the pilot sequence used over a given disturber line in order to obtain an estimate of the crosstalk coupling from the given disturber line into the given victim line. To reject the crosstalk contributions from the other lines, the pilot sequences used over the respective DSL lines 200 are mutually orthogonal (e.g., Walsh-Hadamard sequences).

The one or more selected SYNC symbol positions, during which the new set of vectoring coefficients is temporarily enforced, may correspond to a full pilot cycle or to a subset thereof. Also, the selected SYNC symbol positions are not necessarily contiguous SYNC symbol positions.

The determining module 140 gathers all successive error samples measured over the respective lines 200 (or a subset thereof) during the one or more selected SYNC symbol positions and, based on these error measures, decides whether the new set of vectoring coefficients can partly or wholly substitute for the current set of vectoring coefficients.

For instance, the determining module 140 computes the standard deviation or variance of successive slicer error samples gathered over the respective lines in order to guess whether the power of the residual crosstalk globally increases or decreases with new set of vectoring coefficients. If the residual crosstalk increases over all or most of the lines, then the new set of vectoring coefficients is less optimal than the current set of vectoring coefficients, and thus is to be discarded or needs further refinement. Else, if the residual crosstalk decreases over all or most of the lines (typically beyond a certain margin), then the new set of vectoring coefficients is over-performing compared to the current set of vectoring coefficients, and thus can substitute for the current set of vectoring coefficients. If some lines exhibit a lower residual crosstalk while other lines exhibit a higher residual crosstalk, then some additional computation is required to get further hindsight as per the suitability of the new set of vectoring coefficients.

This technique is rather advantageous when a new line joins a group of vectored lines, and when historical vectoring coefficients applicable to the current disturber/victim combination are directly available from a local data repository, presently vectoring coefficients that were previously used for canceling the crosstalk from that new joining line into the same set of active lines, as well as the crosstalk between these active lines.

During the O/R-P-VECTOR1 initialization phase (VDSL2/G.fast initialization phase whose object is to learn and to cancel the crosstalk from the new joining line into the already active lines), the SYNC symbols can be jointly-processed with these historical vectoring coefficients, while the remaining DATA symbols keep on being jointly-processed with the current set of vectoring coefficients. Error samples measured during the SYNC symbols with the historical vectoring coefficients temporarily in force are next gathered over the active lines, and some statistics are derived from these error samples, such as an estimate of the residual noise power over the respective active lines. These statistics can then be used to decide whether the historical vectoring coefficients are satisfactory and can be enforced during the remaining DATA symbols positions. For instance, if the observed residual noise over the active lines does not worsen, meaning the current vectoring gains can still be achieved over the active lines, then the historical vectoring coefficients are deemed to be satisfactory. This can be done with very few error samples per line, without waiting for the completion of one or more full pilot cycles, thereby substantially shortening the O-P-VECTOR1 phase.

The same technique can further be used during O/R-P-VECTOR2 initialization phase (VDSL2/G.fast initialization phase whose object is to learn and to cancel the crosstalk from the active lines into the new joining line): if error samples over the joining line exhibit a low variance and hence a low power, then the historical coefficients are deemed to properly cancel the crosstalk over the joining line. A reference residual noise power as measured over that particular joining line after crosstalk cancellation with a previous set of vectoring coefficients can be stored in the local data repository, along with the previous set of vectoring coefficients that achieves this reference residual noise power. The observed residual noise power can then be compared against this reference residual noise power so as to decide whether the historical vectoring coefficients are still valid.

In another embodiment, the selected SYNC symbol positions corresponds to a full pilot cycle, and the determining module 140 further correlates the slicer error samples with the respective pilot sequences in order to determine the respective coefficients of the normalized residual crosstalk channel matrix.

The determining module 140 next computes the Frobenius norm or the spectral radius of the normalized residual crosstalk channel matrix (other matrix norms or measures can be used as well). This figure is particularly helpful for determining whether the new set of vectoring coefficients as a whole is more optimal than the current set of vectoring coefficients, and whether the vector processor is updated in the right direction. If so, then the whole new set of vectoring coefficients is enforced at once during all symbol positions.

Also, the Frobenius norm or spectral radius is rather useful for deciding which iterative update algorithm to use for updating the vector processor. Indeed, some algorithms are known to converge if the Frobenius norm or spectral radius of the normalized residual crosstalk channel matrix is less than one, such as the iterative multiplicative update algorithm.

The Frobenius norm or spectral radius can further be used to refine the parameters used by a tracking algorithm, such as the step size of the Least Mean Square (LMS) iterative algorithm.

This technique can be used, for instance, when the set of vectoring coefficients does not converge towards the optimal solution, e.g. on account of some ill-conditioned channel, or on account of an improper algorithm or a badly-tuned algorithm used for updating the vectoring coefficients. If so, then one is able to test another update algorithm or a refined update algorithm.

The use of the SYNC symbol positions is particularly advantageous in that less conservative algorithms for updating the vector processor 120 can be tried without impairing the communications over the lines 200. Indeed, the SYNC symbols do not convey any user payload traffic (but only the so-called SYNC flags that are robustly encoded by means of polarity inversions across multiple tones), and thus the temporary enforcement of the new set of vectoring coefficients during the SYNC symbol periods will not adversely affect the Quality of service (QoS) over the lines 200.

Alternatively, the determining module 140 can compare column-wise, respectively row-wise, the new normalized residual crosstalk channel matrix obtained while the new set of vectoring coefficients is in force with the current normalized residual crosstalk channel matrix obtained while the current set of vectoring coefficients is in force. This column/row-wise comparison can be an element-wise comparison, whereby the respective elements of the columns/rows are compared with one another, or may involve a vector norm, such as the 2-norm.

If a given column, respectively a given row, of the new normalized residual crosstalk channel matrix exhibits lower crosstalk coupling coefficients and thus achieves higher vectoring gains for that particular disturber, respectively for that particular victim, then the corresponding column of the new precoding matrix, respectively the corresponding row of the new postcoding matrix, substitutes for the corresponding column of the current precoding matrix, respectively for the corresponding row of the current postcoding matrix. By so doing, the new set of vectoring coefficients gradually substitutes for the current set of vectoring coefficients whenever the corresponding vectoring gains are substantial for a particular disturber line (precoding), respectively for a particular victim line (postcoding).

Figure 3:
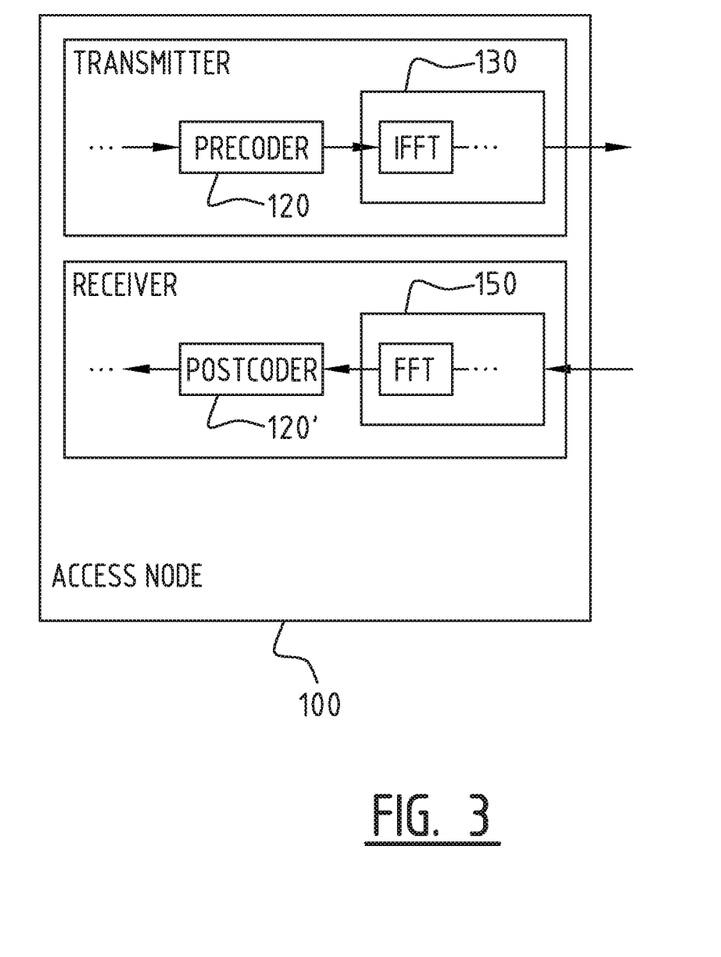
FIG. 3 illustrates another exemplary embodiment of an access point including a pre- and postcoder.

Although embodiments of the method and device have been illustrated above for an implementation where the vector processor is a precoder, the skilled person understands that the vector processor may also be a postcoder. FIG. 3 illustrates an embodiment of an access node 100 with a transmitter section including a precoder 120 and a receiver section including a postcoder 120' located downstream of receiving means 150. Another non-illustrated embodiment may comprise only a postcoder 120' without a precoder 120. Further, it is noted that the processing (precoding) can be done before the sending, in the transmitter section, and/or that the processing (postcoding) can be done upon receipt of a signal from the CPE 300, i.e. after the sending, in the receiver section. When the processing is done before the sending in the transmitter section, the processing implies the applying of a new set of precoder coefficients in the precoder 120, and when the processing is done in the receiver section, the processing implies the applying of a new set of postcoder coefficients in the postcoder 120'. Further it is noted that the applying of a new set of vectoring (precoder and/or postcoder) coefficients may comprise the applying of a full or a partial set of vectoring coefficients. "Partial set" refers to a partial set of the full set of vectoring coefficients associated with the precoder.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "processors" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A method for controlling a vector processor for jointly processing signals to be transmitted over, or received from, a group of vectored lines, and configured with a current set of vectoring coefficients, the method comprising:
   temporarily configuring the vector processor with a new set of vectoring coefficients during one or more selected symbol positions;
   restoring the current set of vectoring coefficients outside the one or more selected symbol positions;
   obtaining at least one error measure over respectively at least one line of the group of vectored lines during the one or more selected symbol positions; and
   determining a suitability indication for the new set of vectoring coefficients based on the obtained at least one error measure.

2. A method according to claim 1, wherein the one or more selected symbol positions are SYNC symbol positions that are used to convey pilot signals for crosstalk estimation within the group of vectored lines.

3. A method according to claim 2, wherein the at least one error measure is representative of at least one residual error over respectively the at least one line during the one or more selected SYNC symbol positions.

4. A method according to claim 2 or 3, wherein the method further comprises, if the determined suitability indication indicates that part or whole of the new set of vectoring coefficients is suitable, enforcing part or whole of the new set of vectoring coefficients during all symbol positions.

5. A method according to claim 2 or 3, wherein the method further comprises, if the determined suitability indication indicates that part or whole of the new set of vectoring coefficients is not suitable:
   selecting a new algorithm for updating the vector processor based on the at least one error measure, or adjusting one or more parameters of an algorithm currently used for updating the vector processor based on the at least one error measure; and
   determining a further new set of vectoring coefficients by means of the selected new algorithm or the adjusted current algorithm.

6. A method according to claim 1, wherein the one or more selected symbol positions are DATA symbol positions that are used to convey user payload traffic.

7. A method according to claim 6, wherein the at least one error measure is representative of any transmission error respectively occurring over the at least one line during the one or more selected DATA symbol positions, and comprises at least one of:
   a Forward Error Correction FEC counter;
   a retransmission counter value related to retransmission events of data units transmitted during the one or more selected DATA symbol positions; and
   a noise level, in particular an impulse noise level.

8. A method according to claim 6, wherein a number of selected DATA symbol positions is determined so as not to significantly degrade user experience over the at least one line,
   and wherein temporarily configuring is performed with said determined number of selected DATA symbol positions.

9. A method according to claim 8, wherein the steps of the method are repeated with an increasing number of selected DATA symbol positions if the determined suitability indication indicates that the new set of vectoring coefficients is suitable.

10. A method according to claim 6, wherein the group of vectored lines comprises at least one joining line,
    and wherein a ZERO DATA symbol having zero power is substituted by a DUMMY DATA symbol having non-zero power over the at least one joining line during the one or more selected DATA symbol positions.

11. A method according to claim 6, wherein determining the suitability indication based on the obtained at least one error measure comprises at least one of:
    determining whether a number of DATA symbols that may be sent with the new set of vectoring coefficients can be increased without user experience degradation;
    determining whether line parameters of one or more lines of the group of vectored lines need to be modified such that the group of vectored lines becomes more tolerant to the new set of vectoring coefficients;
    determining whether the new set of vectoring coefficients need further improvement; and
    determining whether a power of a DUMMY DATA symbol transmitted over at least one joining line can be increased.

12. A method according to claim 6, wherein the vector processor is located in a transmitter section or in a receiver section,
    and wherein the method further comprises communicating, from the transmitter section to the receiver section, the positions of the one or more selected DATA symbol positions; or communicating, from the receiver section to the transmitter section, a request for substituting ZERO DATA symbols with DUMMY DATA symbols in predetermined symbol positions.

13. A method according to claim 1, wherein the new set of vectoring coefficients are derived from previously-determined crosstalk or vectoring coefficients.

14. A controller for controlling a vector processor for jointly processing signals to be transmitted over, or received from, a group of vectored lines, and configured with a current set of vectoring coefficients, the controller comprising:
- a configuring module configured to temporarily configure the vector processor with a new set of vectoring coefficients during one or more selected symbol positions, and for restoring the current set of vectoring coefficients outside the one or more selected symbol positions;
- an obtaining module configured to obtain at least one error measure over respectively at least one line of the group during the one or more selected symbol positions; and
- a determining module configured to determine a suitability indication for the new set of vectoring coefficients based on the obtained at least one error measure.

15. An access node comprising a controller according to claim 14.

\* \* \* \* \*